Aug. 11, 1964   L. E. TASSELL   3,143,981
DEMOUNTABLE PARTITION
Filed March 23, 1962   3 Sheets-Sheet 1
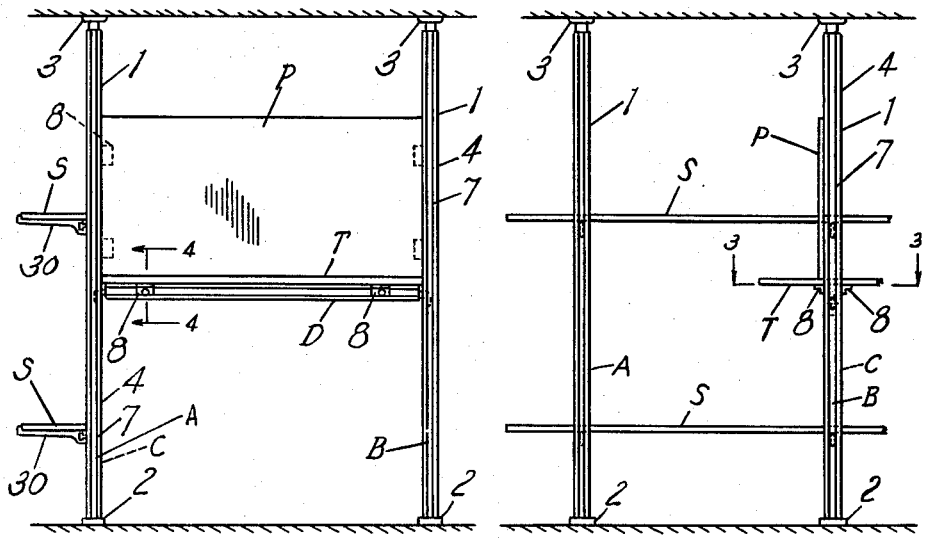
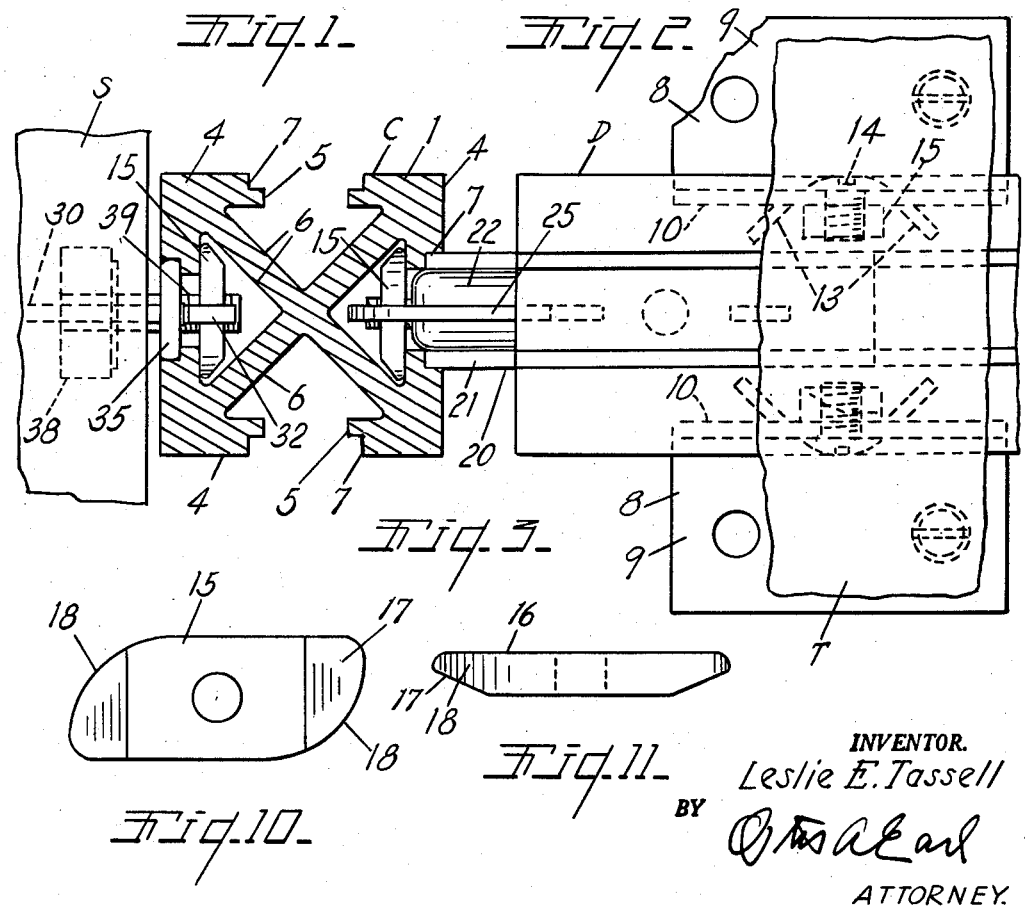
INVENTOR.
Leslie E. Tassell
BY
ATTORNEY.

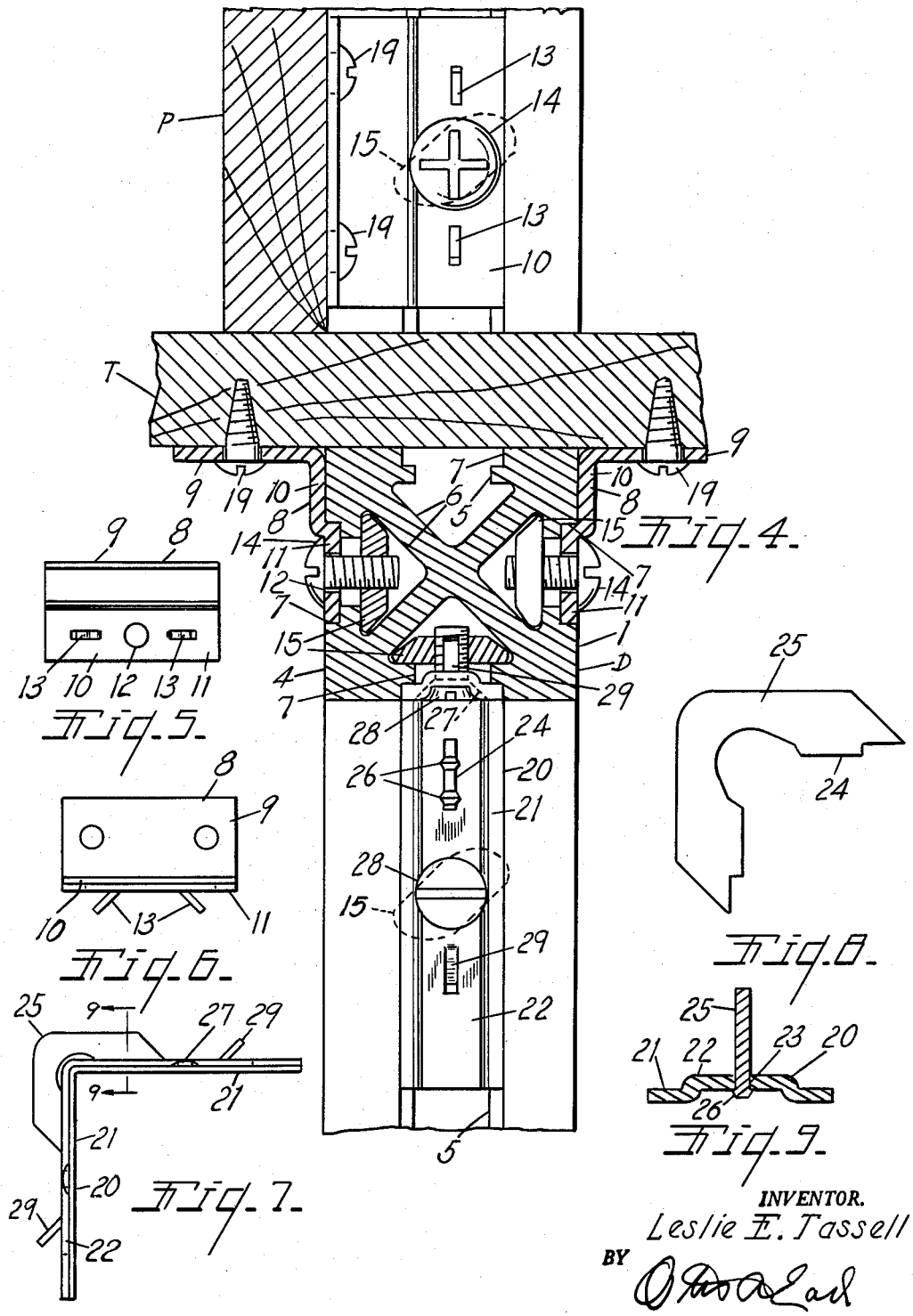

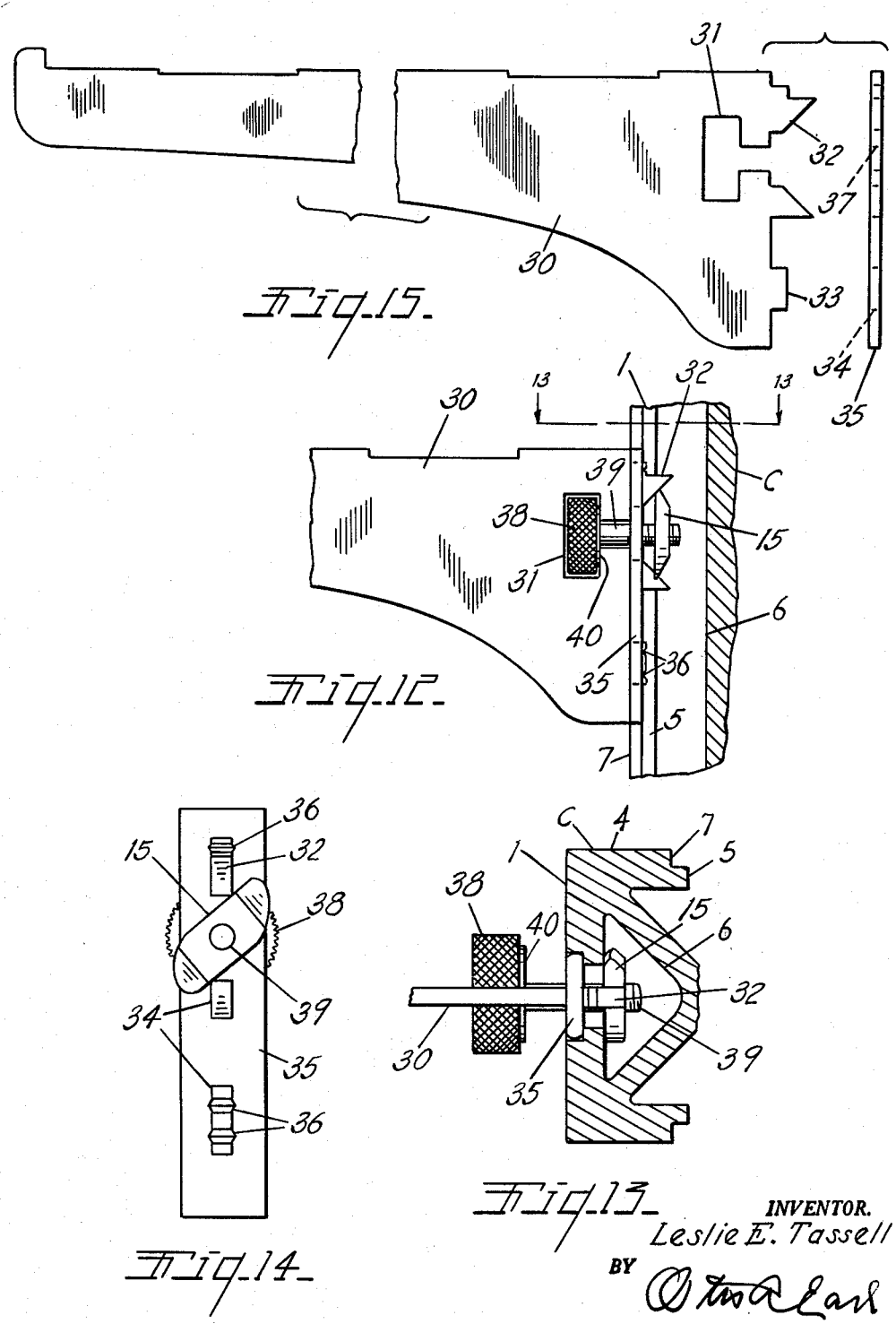

United States Patent Office 3,143,981
Patented Aug. 11, 1964

3,143,981
DEMOUNTABLE PARTITION
Leslie E. Tassell, Grand Rapids, Mich., assignor to Tassell Hardware Company, Grand Rapids, Mich.
Filed Mar. 23, 1962, Ser. No. 181,868
11 Claims. (Cl. 108—108)

This invention relates to improvements in demountable partition structure. The principal objects of this invention are—

First, to provide simple and economical connecting elements for selectively connecting upright supporting posts to horizontal connecting means and vertical and horizontal panels for erecting partitions, shelves and desk or table panels in a wide variety of arrangements.

Second, to provide novel forms of connecting clips which will quickly and securely connect post and beam elements having slotted side walls and which will connect panels to the slotted side walls at various positions.

Third, to provide a novel form of releasable clamp coacting between overhanging side walls of recessed columns and projecting portions of the clamp attachable to other elements.

Fourth, to provide a clamp which will fit into a shouldered portion of a slotted wall to resist lateral twisting relative to the wall and support an oblong nut within the slot with stop elements engageable with the nut to limit rotation so that the nut can be drawn tight on the inner side of the slot.

Fifth, to provide a novel form of clamp and bracket in which a flat support engaging portion is economically and rigidly connected to a perpendicular reinforcing or article supporting member by means of a staked connection between the parts.

Sixth, to provide a novel form of shelf bracket attachable to the recessed and slotted side wall of a supporting column in which a column engaging clamp strip is secured perpendicularly across the end of the bracket by means of a staked connection and in which a thumb nut is mounted in a T-shaped slot in the bracket and projects through the clamp plate to an oblong clamp nut with stop lugs on the inner edge of the bracket coacting with the nut to limit rotation of the nut and facilitate clamping of the nut and the clamp plate to the column.

Other objects and advantages of the invention will be apparent from a consideration of the following description and claims. The drawings, of which there are three sheets, illustrate a highly practical form of the partition structure and the several clamping connections employed therein.

FIG. 1 is a front elevational view of an assembly of partition, desk and shelf panels mounted in a room by means of the connections and clamps of the invention.

FIG. 2 is a fragmentary side elevational view of the partition and shelf structure shown in FIG. 1.

FIG. 3 is a fragmentary horizontal cross sectional view taken along the plane of the line 3—3 in FIG. 2.

FIG. 4 is an enlarged fragmentary vertical cross sectional view taken along the plane of the line 4—4 in FIG. 1.

FIG. 5 is a front elevational view of the panel attaching clip shown in FIGS. 3 and 4.

FIG. 6 is a projected bottom plan view of the clip shown in FIG. 5.

FIG. 7 is an enlarged side elevational view of the beam and column connecting clamp shown in FIGS. 3 and 4.

FIG. 8 is a side elevational view of the reinforcing plate of the clamp shown in FIG. 7 prior to assembly.

FIG. 9 is a transverse cross sectional view showing the connection between the clamp and reinforcing plate.

FIG. 10 is an enlarged plan view of the clamp nut employed with both the clamps shown in FIGS. 5 and 7.

FIG. 11 is an edge elevational view of the clamp nut shown in FIG. 10.

FIG. 12 is a fragmentary side elevational view of the connection between the shelf supporting bracket and the supporting column of the partition structure, with the column partially broken away in cross section.

FIG. 13 is a fragmentary horizontal cross sectional view taken along the plane of the line 13—13 in FIG. 12.

FIG. 14 is a fragmentary end elevational view of the shelf supporting bracket and clamp structure shown in FIGS. 12 and 13.

FIG. 15 is a fragmentary exploded view of the parts of the shelf supporting bracket and clamp.

It has previously been proposed to mount shelves, partition panels and desk or table panels in a room by means of supporting posts having their ends engaged between the ceiling and floor of the room. In the drawings there are illustrated upright vertical posts 1 of this type. The posts are conveniently formed as continuous aluminum extrusions of uniform cross section having floor engaging pads 2 and ceiling engaging fixtures 3 on their upper ends. Posts of this general nature are not claimed as part of the present invention, but are disclosed to show the coaction of the connecting clamps and fixtures associated therewith. The posts have right angularly arranged side walls 4 with central longitudinal slots 5 formed therein opening to elongated interior recesses 6 and having widened outwardly facing shoulders 7 formed along the overhanging portions of the side walls. These slots and the overhanging side walls permit attachment of clamps and brackets in a wide variety of selected positions along any part of any side wall of the posts.

In the arrangement illustrated in FIGS. 1 and 2, three posts A, B and C are arranged in a right triangular relation with a horizontal cross beam D of the same cross sectional shape as the posts connected by the posts B and C. Posts B and C support a vertical partition panel P while the cross beam D supports a horizontal desk or table panel T. Posts A and C support plural shelf panels S. As stated, the panels and partitions can be arranged in a wide variety of positions and the positions selected are for the purpose of disclosing the clamping and connecting functions of the clamps and fittings of the invention.

FIGS. 3, 4, 5 and 6 illustrate the structure and action of the first attaching and connecting element consisting of an angled clip 8 having a flat flange 9 extending at right angles from the longer side of a clamping flange 10. The clamping flange 10 has an outwardly offset edge portion 11 sized to fit snugly within the shouldered portion 7 of the slot in either the post 1 or crossbar D. A central screw hole 12 is formed in the offset portion 11 with outwardly or rearwardly struck inclined stop ears 13 on either side of the screw hole. The ears thus project into the slot 5 when the clip is applied to the side of one of the extruded sections. A screw 14 is extended through the hole 12 and provided with an oblong nut 15 shown in greater detail in FIGS. 10 and 11. The nut has a front face 16 that is generally flat and adapted to clamp against the inner side of the side wall 4 and the width of the nut permits it to pass through the slot 5. The rear face of the nut is tapered at the ends as at 17 to clear the tapered sides of the recesses 6 and the ends of the nut are rounded as at 18. The rounded ends 18 coact with the stop ears 13 to cam the nut and the screw rearwardly or inwardly of the recess should the nut become displaced in inserting the clip into the slot of the supporting beam or post. Desirably, but not necessarily, the screws 14 and nuts 15 are temporarily wedged by jamming the extreme inner thread of the screw in the nut so as to turn as a unit. Clockwise tightening motion of the screw immediately breaks the jam connection and the nut can be tightened within the recess.

The flanges 9 of the clips 8 have holes for wood screws 19 which secure the panels to the clips after the clips have been secured to the metal beam or post. As shown, the clips 8 are attachable to both the horizontal table panel T and the vertical partition P.

FIGS. 3, 4, 7, 8 and 9 show a second form of connecting clamp and bracket 20 for connecting the extruded posts and beams in perpendicular relation with the beam extending from the side of the post. The clips 20 have angularly arranged flat side arms 21 that are symmetrical and extend at right angles to each other from their connected ends. The arms 21 are sized to fit snugly within the shouldered portion 7 of the slots 5 and are provided with outwardly offset stiffening ribs 22 which project slightly into the slots 5. Toward their inner or adjacent ends the ribs 22 are slotted as at 23 (see FIG. 9) to receive the inwardly projecting ears 24 formed on the inner sides of an angle shaped reinforcing plate 25. The arms of the reinforcing plate abut against the outer sides of the stiffening rib 22 and are secured tightly thereagainst by staking over the inner edge of the ears 24 as at 26. This makes it extremely inexpensive to provide a relatively rigid anchor connecting clip which will engage the slots in two adjacent extruded members.

Outwardly from the ends of the reinforcing plate 25 the stiffening rib 22 is formed with a countersunk seat 27 and hole for a clamp screw 28. A single stop ear 29 is struck outwardly from the clip adjacent to the screw hole and the end of the reinforcing plate functions as a cooperating opposed stop. The screws 28 are provided with clamp nuts 15 which are the same as the nuts previously described in conjunction with the clip 8. The clamping action of the nuts is the same and a light but relatively rigid connection can quickly be made between the posts 1 and the cross beam D with the connecting clip substantially concealed within the slotted and shouldered sides of the extrusions. The angled reinforcing plates 25 project into the recesses of the extrusions and effectively reinforce the connection without being exposed outside of the posts.

The brackets for supporting the shelves S consist of flat plates 30 shown more clearly in FIGS. 12 to 15. At their inner mounting ends the plates are vertically thickened and define T-slots 31 opening to their inner edges with spaced inwardly projecting ears 32 on each side of the slot. A third ear 33 projects inwardly below the upper two ears and all three are received in and project through slots 34 provided therefor in an upright clamp strip 35 ararnged perpendicularly across the edge of the plate 30. The strip 35 is sized to fit in the shouldered portion 7 of the extruded posts and the upper and lower ears on the bracket plate are firmly secured to the clamp strip by staking as at 36. The clamp strip defines a hole 37 opposite the end of the T-slot 31.

A thumb screw having a knurled head 38 disposed in the enlarged part of the T-slot and a shank 39 passing through the narrow portion of the T-slot and the hole in the clamp strip threadedly engages an oblong nut 15 the same as the nuts employed on the other clamps and brackets. A thrust washer 40 around the outer end of the thumb screw bears against the inner edge of the T-shaped slot.

The clamp strip 35 and the bracket plate 30 are applied at the selected position to the slotted side of the posts 1 and the head 38 of the thumb screw manipulated to first guide the nut 15 into the slot, after which rotation of the thumb screw in a counterclockwise rotation will first cause the cam edge 18 of the nut to engage the spaced ears 32 and cam the nut inwardly behind the shouldered wall 7. With the nut located in the recess 6 the screw and nut are reversely rotated in a tightening rotation until the straight sides of the nut engage the stop ears 32 with the ends of the nut overlying the inner sides of the shouldered walls 7. Continued tightening action of the screw clamps the clamp strip and the bracket to the post, as will be understood. The shelf panels S may be seated to the bracket arms 30 in any desired fashion.

It is a common feature of the attaching brackets and clamps that each of them provides a clamp or mounting face of substantial length which fits within the shouldered slot 5 and the edges of the shouldered portion 7 to prevent lateral rotation or twisting of the clamp on the extruded section. The clamps further provide the spaced inclined stop ears that limit rotation of the clamp nuts and cammingly engage the curved ends of the clamp nuts to move the nuts inwardly of the recess 6 where they will effectively overlap and clamp against the side edges of the slots when the screws are tightened. This structure facilitates easy assembly of the clamping and attaching brackets and assures firm clamping engagement of the nuts with the supporting posts and beams.

What is claimed as new is:

1. Demountable partition and shelf structure comprising, three upright posts in right triangular relation and having vertically slotted and shouldered side walls with longitudinal recesses overhung by the side walls, a horizontal beam of the same cross section as said posts disposed between two of said posts, a pair of first brackets connecting the ends of said beam to the sides of the adjacent posts and including right angularly bent clips of a width fitting within the shoulders of the adjacent side walls, outwardly offset central ribs formed in said clips and around the bends thereof and extending into the slots of the adjacent beam and posts, a flat reinforcing plate arranged perpendicularly to the outside surface of said clips and having right angularly disposed inner edges abutted against the ribs in the center of the arms of said clips, ears on said inner edges projecting through slots provided therefor in said clips and secured thereon by staking on the inner sides of said clips, holes formed through the sides of said clips at the ends of said plates, stop prongs struck angularly outwardly from the centers of the arms of said clips at points spaced outwardly along the arms from said holes, screws passed outwardly through said holes, oblong nuts of a width to pass through said slots engaged with said screws and disposed in the recesses of said beam and adjacent posts in angled crossing relation to said slots to clamp said clips to said side walls, the ends of said plate and said stop prongs being spaced less than the length of said nuts and acting as rotation limiting stops for the nuts, a horizontal shelf panel arranged in lapped relation to said beam, a vertical partition panel arranged in lapped relation to two of said posts, other angled clips having elongated flanges joined along their longer edges, first flanges of said other clips having an outwardly offset outer edge fitting within the shouldered side walls of said beam and said posts, the other flanges of said other clips lying in the plane of the adjacent side walls of the beam and posts and being secured by screws to said panels, other stop prongs struck angularly outwardly from said first flanges on opposite sides of a screw hole formed in the flanges, other nuts and screws the same as said first nuts and screws engaged with said first flanges of said other clips and the slotted side walls of said beam and said posts, a pair of shelf bracket arms of flat stock arranged vertically on edge and having T-shaped slots opening to their inner ends, spaced prongs projecting from the inner ends of said bracket arms on opposite sides of said T-shaped slot and therebelow, clamp strips abutted crosswise to the inner ends of said bracket arms and having slots passing through said prongs, vertically spaced portions of said prongs being staked on the inner sides of said clamp strips, a thumb screw having a knurled head positioned in the wide part of said T-slot with a shank extending through a hole provided therefor in said clamp strip, and an oblong nut like said other nuts on said screws clamped against the inside of the recesses of said posts and clamping said clamp strip in said shouldered side walls.

2. Demountable partition and shelf structure comprising, three upright posts in right triangular relation and having vertically slotted and shouldered side walls with longitudinal recesses overhung by the side walls, a horizontal beam of the same cross section as said posts disposed between two of said posts, a pair of first brackets connecting the ends of said beam to the sides of the adjacent posts and including right angularly bent clips of a width fitting within the shoulders of the adjacent side walls, a flat reinforcing plate arranged perpendicularly to the outside surface of said clips and having right angularly disposed inner edges abutted against the center of the arms of said clips, ears on said inner edges projecting through slots provided therefor in said clips and secured thereon by staking on the inner sides of said clips, holes formed through the sides of said clips at the ends of said plates, stop prongs struck angularly outwardly from the centers of the arms of said clips at points spaced outwardly along the arms from said holes, screws passed outwardly through said holes, oblong nuts of a width to pass through said slots engaged with said screws and disposed in the recesses of said beam and adjacent posts in angled crossing relation to said slots to clamp said clips to said side walls, the ends of said plate and said stop prongs being spaced less than the length of said nuts, a horizontal shelf panel arranged in lapped relation to said beam, a vertical partition panel arranged in lapped relation to two of said posts, other angled clips having elongated flanges joined along their longer edges, first flanges of said other clips having an outwardly offset outer edge fitting within the shouldered side walls of said beam and said posts, the other flanges of said other clips lying in the plane of the adjacent side walls of the beam and posts and being secured by screws to said panels, other stop prongs struck angularly outwardly from said first flanges on opposite sides of a screw hole formed in the flanges, other nuts and screws the same as said first nuts and screws engaged with said first flanges of said other clips and the slotted side walls of said beam and said posts, a pair of shelf bracket arms of flat stock arranged vertically on edge and having T-shaped slots opening to their inner ends, spaced prongs projecting from the inner ends of said bracket arms on opposite sides of said T-shaped slot, clamp strips abutted crosswise to the inner ends of said bracket arms and having slots passing said prongs, vertically spaced portions of said prongs being staked on the inner sides of said clamp strips, a thumb screw having a knurled head positioned in the wide part of said T-slot with a shank extending through a hole provided therefor in said clamp strip, and an oblong nut like said other nuts on said screws clamped against the inside of the recesses of said posts and clamping said clamp strip in said shouldered side walls.

3. A clamp for connecting parts to the side of an extruded support having a slotted side wall overhanging a longitudinal recess, the side wall being shouldered along the outer side of said slot, said clamp comprising a support engaging strip sized to fit against and within the shouldered part of said side wall, spaced divergent stop ears projecting inwardly from said strip on opposite sides of a hole formed through the strip, a clamp screw passed inwardly through said hole, and an oblong nut on the inner end of the screw, said nut being of a width to pass through said slot and of a length to bridge the slot, the thread between the screw and nut being jammed at the end of the screw permitting rotation of the nut with the screw, the ends of the nut being oppositely rounded in cams cooperative with said stop ears on loosening rotation of the screw and with longer straight sides on the opposite sides of the nuts from said rounded ends, the ends of said nut being outwardly beveled on their rear sides.

4. A clamp for connecting parts to the side of an extruded support having a slotted side wall overhanging a longitudinal recess, the side wall being shouldered along the outer side of said slot, said clamp comprising a support engaging strip sized to fit against and within the shouldered part of said side wall, spaced divergent stop ears projecting inwardly from said strip on opposite sides of a hole formed through the strip, a clamp screw passed inwardly through said hole, and an oblong nut on the inner end of the screw, said nut being of a width to pass through said slot and of a length to bridge the slot, the ends of the nut being oppositely rounded in cams cooperative with said stop ears on loosening rotation of the screw and with longer straight sides on the opposite sides of the nuts from said rounded ends.

5. A clamp for connecting parts to the side of an extruded support having a slotted side wall overhanging a longitudinal recess, the side wall being shouldered along the outer side of said slot, said clamp comprising a support engaging strip sized to fit against and within the shouldered part of said side wall, spaced divergent stop ears projecting inwardly from said strip on opposite sides of a hole formed through the strip, a clamp screw passed inwardly through said hole, and an oblong nut on the inner end of the screw, said nut being of a width to pass through said slot and of a length to bridge the slot, the ends of the nut being oppositively rounded in cams cooperative with said stop ears on loosening rotation of the screw and with longer straight sides on the opposite sides of the nuts from said rounded ends, at least one of said ears being struck from the central portion of said strip and folded rearwardly.

6. A clamp for supporting a part on an extruded support having a longitudinally slotted face with a recess therebehind and an outwardly facing shoulder on each side of the slot comprising a clamp strip of a width to fit between said shoulders, said strip defining a hole with a pair of aligned slots on each side thereof and a third slot therebelow, a support plate arranged edgewise to said clamp strip and having connecting ears projecting through said slots, the upper and lower ears being staked in clamping engagement with the rear of the clamp strip, the ears of the opposite side of said clamp strip, the ears of the opposite side of said hole projecting and diverging rearwardly of said clamp strip, a T-shaped slot formed in said plate and opening to said hole in said clamp strip, a thumb screw having a head positioned in the wide part of said T-slot and having its shank projecting through said hole, and an oblong nut on the end of said screw rotatively engageable with said rearwardly projecting clamp ears, the ends of said nut being symmetrically cammed and cut back on the leading corners of the nut as viewed from the stem end of the screw and having longer sides on the opposite sides of the nut from said cut back corners.

7. A clamp for supporting a part on an extruded support having a longitudinally slotted face with a recess therebehind and an outwardly facing shoulder on each side of the slot comprising a clamp strip of a width to fit between said shoulders, said strip defining a hole with a pair of aligned slots on each side thereof and a third slot therebelow, a support plate arranged edgewise to said clamp strip and having connecting ears projecting through said slots, the upper and lower ears being staked in clamping engagement with the rear of the clamp strip, the ears of the opposite side of said hole projecting and diverging rearwardly of said clamp strip, a T-shaped slot formed in said plate and opening to said hole in said clamp strip, a thumb screw having a head positioned in the wide part of said T-slot and having its shank projecting through said hole, and an oblong nut on the end of said screw rotatatively engageable with said rearwardly projecting clamp ears.

8. A clamp for supporting a part on an extruded support having a longitudinally slotted face with a recess therebehind and an outwardly facing shoulder on each side of the slot comprising, an angled clip having arms of a width to fit between the shoulders of said face and an offset rib formed along said arms outwardly of the angled clip, holes formed through the transverse centers of said arms at equal distances from the angle, counter-sunk seats formed outwardly around said holes in said arms and said rib, slots formed in the centers of said arms between said holes and said angle, an angled reinforcing plate having arms bearing perpendicularly against the outside of said arms and having ears projecting through said slots and secured by staking on the inside of the clip, the ends of said plate being cut at angles diverging from said adjacent holes, stop ears struck from the center of the arms of said clip and inclined outwardly therefrom in divergent relation to the ends of said plate on the opposite sides of said holes, screws in said holes, and oblong nuts on said screws of a width capable of passing through said slot in said support, the ends of said nuts being symmetrically cammed and cut back on the leading corners of the nuts as viewed from the stem ends of the screws and having longer sides on the opposite sides of the nut from said cut back corners.

9. A clamp for supporting a part on an extruded support having a longitudinally slotted face with a recess therebehind and an outwardly facing shoulder on each side of the slot comprising, an angled clip having arms of a width to fit between the shoulders of said face, holes formed through the transverse centers of said arms at equal distances from the angle, counter-sunk seats formed outwardly around said holes in said arms, slots formed in the centers of said arms between said holes and said angle, an angled reinforcing plate having arms bearing perpendicularly against the outside of said arms and having ears projecting through said slots and secured by staking on the inside of the clip, the ends of said plate being cut at angles diverging from said adjacent holes, stop ears struck from the center of the arms of said clip and inclined outwardly therefrom in divergent relation to the ends of said plate on the opposite sides of said holes, screws in said holes, and oblong nuts on said screws of a width capable of passing through said slot in said support.

10. A clamp for supporting a part on an extruded support having a longitudinally slotted face with a recess therebehind and an outwardly facing shoulder on each side of the slot comprising, a clip having one arm with an offset portion sized to fit between said shoulders and another arm bent from the side edge of the first arm oppositely from the offset, said second arm having holes formed therein for attachment to the part to be supported, a hole formed centrally of said offset portion, ears struck from said offset portion and bent rearwardly in divergent relation to each other on opposite sides of said hole, and a screw passed through said hole with an oblong nut on its end positioned between said ears, said nut having a width less than the width of said slot and having its ends cut back in cam surfaces on the leading corners of the nut as viewed from the stem end of the screw and having longer sides on the opposite sides of the nut from said cut back corners.

11. A clamp for supporting a part on an extruded support having a longitudinally slotted face with a recess therebehind and an outwardly facing shoulder on each side of the slot comprising, a clip having one arm with an offset portion sized to fit between said shoulders and another arm bent from the side edge of the first arm oppositely from the offset, said second arm having holes formed therein for attachment to the part to be supported, a hole formed centrally of said offset portion, ears struck from said offset portion and bent rearwardly in divergent relation to each other on opposite sides of said hole, and a screw passed through said hole with an oblong nut on its end positioned between said ears, said nut having a width less than the width of said slot.

References Cited in the file of this patent

UNITED STATES PATENTS

| | | |
|---|---|---|
| 568,825 | Winslow et al. | Oct. 6, 1896 |
| 621,172 | Stikeman | Mar. 14, 1899 |
| 940,017 | Holden | Nov. 16, 1909 |
| 1,608,592 | Funk | Nov. 30, 1926 |
| 2,301,306 | McDonald | Nov. 10, 1942 |
| 2,380,379 | Attwood | July 31, 1945 |
| 2,915,196 | Pira | Dec. 1, 1959 |
| 2,940,718 | Beal | June 14, 1960 |